United States Patent Office 3,322,751
Patented May 30, 1967

3,322,751
7 - (3' - METHYL-4'-FURAZANACETAMIDO)-CEPHALOSPORANIC ACID AND 6 - (3' - METHYL - 4'-FURAZANACETAMIDO)PENICILLANIC ACID AND RELATED SALTS AND DERIVATIVES
Leonard Bruce Crast, Jr., North Syracuse, N.Y., assignor to Bristol-Myers Company, New York, N.Y., a corporation of Delaware
No Drawing. Filed Mar. 30, 1966, Ser. No. 538,611
5 Claims. (Cl. 260—239.1)

This invention relates to new synthetic compounds of value as antibacterial agents, as nutritional supplements in animal feeds, as agents for the treatment of mastitis in cattle, and as therapeutic agents in poultry and animals, including man, in the treatment of infectious diseases caused by Gram-positive and Gram-negative bacteria and especially salmonella and, more particularly, relates to 7 - (3'-methyl-4'-furazanacetamido)-cephalosporanic acid and 6-(3'-methyl-4'-furazanacetamido)-penicillanic acid and related salts and derivatives.

Antibacterial agents of the penicillin class have proven highly effective in the therapy of infections due to either Gram-positive or Gram-negative bacteria but few are effective against both, very few are effective in concentrations below 1.0 mcg./ml. and none are very effective in practical use against infections caused by Salmonella, e.g. S. enteritidis. It was the object of the present invention to provide novel compounds effective against both Gram-positive and Gram-negative bacteria including the resistant strains. It was a further object of the present invention to provide penicillins and cephalosporins active against Gram-positive and Gram-negative bacteria which are also efficiently absorbed upon oral administration to man and animals.

The objects of the present invention have been achieved by the provision, according to the present invention, of the acids of the formula

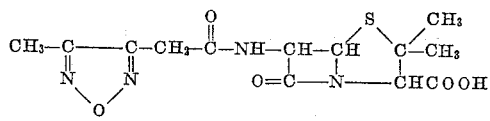

and nontoxic, pharmaceutically acceptable salts thereof.

The objects of the present invention have also been achieved by the provision, according to the present invention, of the compounds of the formula (I)

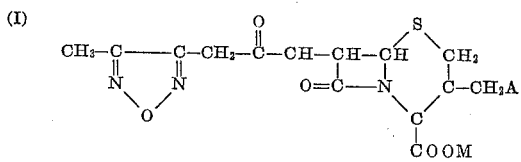

wherein

A is hydrogen, hydroxyl, (lower) alkanoyloxy containing 2–8 carbon atoms, e.g. acetoxy, propionoyloxy, butanoyloxy, pentanoyloxy, etc., benzoyloxy, a quaternary ammonium radical, e.g. pyridinium, quinolinium, picolinium, lutidinium, or, when taken together with M, a monovalent carbon-oxygen bond; and M is hydrogen, a pharmaceutically acceptable nontoxic cation, an anionic charge when A is a quaternary ammonium radical, or, when taken together with A, a monovalent carbon-oxygen bond.

For clarity, we have illustrated below the formulae of the compounds when, in Formula I, A is a quaternary ammonium radical (pyridinium) and M is an anionic charge and when A and M together are a monovalent carbon-oxygen bond.

(II)

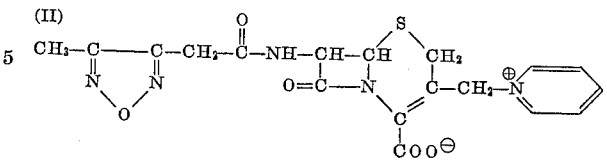

(III)

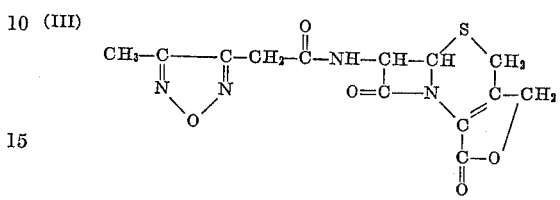

The preferred embodiments of the present invention are the free acids and salts thereof of which the free acids have the formulae

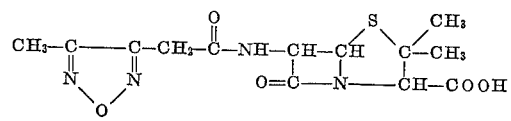

(IV)

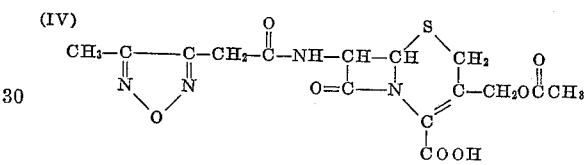

and (V)

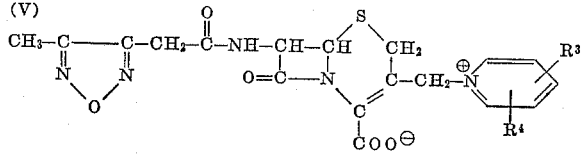

The pharmaceutically-acceptable, nontoxic cations include metallic cations such as sodium, potassium, calcium and aluminum and organic amine cations such as trialkylamines, e.g. triethylamine, procaine, dibenzylamine, N-benzyl-β-phenethylamine, 1-ephenamine, N,N'-dibenzylethylenediamine, dehydroabietylamine, N,N'-bis-dehydroabietylethylenediamine, N - (lower)alkylpiperidines, e.g. N-ethylpiperidine, and other amines which have been used to form salts with benzylpenicillin.

The products of the present invention are prepared by the reaction of 6-aminopenicillanic acid or a compound of the formula (VI)

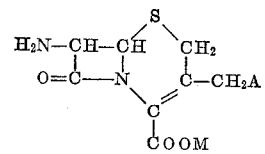

wherein A and M are described above (preferably in the form of a neutral salt such as the sodium salt or the triethylamine salt, i.e. when A is hydrogen, hydroxy, (lower)alkanoyloxy or benzoyloxy) with an active ester, e.g. 2,4-dinitrophenyl ester, p-nitrophenyl ester or N-hydroxysuccinimide ester, of an acid having the formula

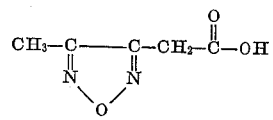

or with its functional equivalent as an acylating agent for a primary amino group. Such equivalents include the corresponding carboxylic chlorides, bromides, acid anhydrides, including mixed anhydrides and particularly the mixed anhydrides prepared from stronger acids such as the lower aliphatic monoesters of carbonic acid, of alkyl and aryl sulfonic acids and of more hindered acids such as diphenylacetic acid. In addition, an acid azide or an active ester or thioester (e.g. with p-nitro-phenol, 2,4-dinitrophenol, thiophenol, thioacetic acid) may be used or the free acid itself may be coupled with 7-aminoacephalosporanic acid after first reacting said free acid with N, N'-dimethylchloroformininium chloride [cf. Great Britain 1,008,170 and Novak and Weichet, Experientia XXI/6, 360 (1965)] or by the use of enzymes or of an N,N'-carbonyldiimidazole or an N,N'-carbonyditriazole [cf. South African patent specification 63/2684] of a carbodiimide reagent [especially N,N'-dicyclohexylcarbodiimide, N,N'-diisopropylcarbodiimide or N-cyclohexyl-N'-(2-morpholinoethyl) carbodiimide; cf. Sheehan and Hess, J. Amer. Chem. Soc., 77, 1067 (1955)], or of alkynylamine reagent [cf. R. Buijle and H. G. Viehe, Agnew. Chem. International Edition, 3, 582 (1964)], or of a ketenimine reagent [cf. C. L. Stevens and M. E. Monk, J. Amer. Chem. Soc., 80, 4065 (1958)] or of an isoxazolium salt reagent [cf. R. B. Woodward, R. A. Olofson and H. Mayer, J. Amer. Chem. Soc., 83, 1010 (1961)]. Another equivalent of the acid chloride is a corresponding azolide, i.e. an amide of the corresponding acid whose amide nitrogen is a member of a quasiaromatic five-membered ring containing at least two nitrogen atoms, i.e. imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separated and the imidazolide isolated, but this is not essential. The methods for carrying out these reactions to produce a cephalosporin and the methods used to isolate the cephalosporin so-produced are well-known in the art (cf. U.S. Patents Nos. 3,079,314, 3,117,126 and 3,129,224 and British Patents Nos. 932,644, 957,570 and 959,054).

The compounds of Formula VI used in the present invention include 7-aminocephalosporanic acid and derivatives of 7-aminocephalosporanic acid. 7-aminocephalosporanic acid is prepared by hydrolysis of cephalosporin C and has the formula

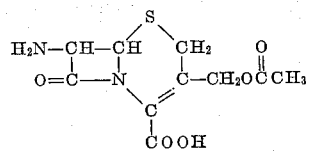

Acid hydrolysis of cephalosporin C to produce 7-aminocephalosporanic acid results in the coproduction of the lactone, 3-hydroxymethyl-7-aminodecephalosporanic acid lactone, formed by the further hydrolysis of the acetoxy group and subsequent internal esterification. The lactone has the formula

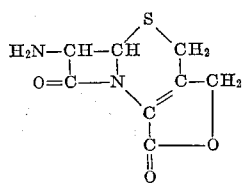

Enzymatic hydrolysis of the acetoxy group of 7-aminocephalosporanic acid results in the formation of 3-hydroxymethyl-7-aminodecephalosporanic acid having the formula

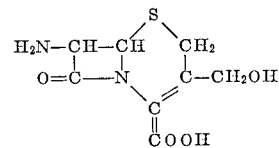

and such compound may be re-esterified with benzoic acid or a lower alkanoic acid, e.g. acetic acid, propionic acid and the like to form other esters. Preferably, re-esterification is carried out on a 3-hydroxymethyl-7-($\alpha$-hydroxy-thienylacetamido)decephalosporanic acid which is obtained by enzymatic hydrolysis of a 7-($\alpha$-hydroxy-thienylacetamido)cephalosporanic acid.

Treatment of cephalosporin C with a tertiary amine, e.g. pyridine, lutidines, picolines and the like, followed by acid hydrolysis produces a nucleus which, in the case of pyridine, has the formula

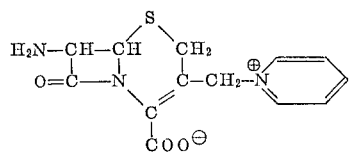

and has been given the name 3-pyridiniummethyl-7-aminodecephalosporanic acid inner salt.

The foregoing nuclei and the preparation thereof are known in the art and are described for example in U.S. Patent No. 3,117,126 and British Patents Nos. 932,644, 957,570 and 959,054.

3-methyl-7-aminodecephalosporanic acid having the formula

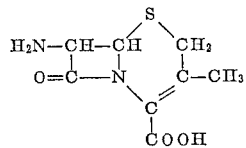

is produced by catalytic reduction of cephalosporin C followed by hydrolytic removal of the 5-aminoadipoyl side chain as described in U.S. Patent No. 3,129,224.

STARTING MATERIALS

The ring system having the structure

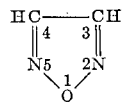

is named 1,2,5-oxadiazine or furazan with the atoms numbered as indicated.

The 3-methyl-4-furazanacetic acid used in the present invention is prepared, for example, in the manner set forth in Example 1 below from 3-methyl-4-furazancarboxylic acid which in turn is prepared according to the literature, e.g., Berichte, 28, 70, 71 (1895), by oxidation of commercially available 3,4-dimethyl-1,2,5-oxadiazine.

The following examples will serve to illustrate this invention without limiting it thereto. All melting points are uncorrected and all temperatures are given in degrees centigrade.

Example 1

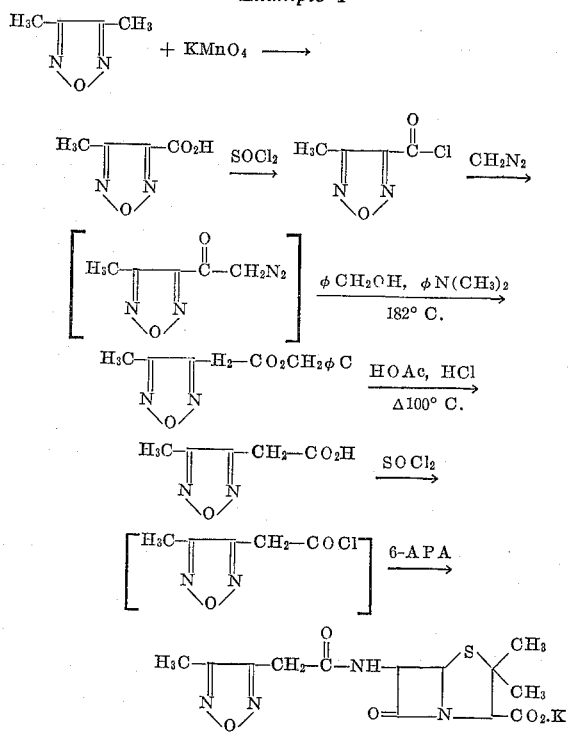

(I) *3-methyl-4-furazancarboxylic acid.*—Via Berichte 28, 70, 71 (1895).

(II) *3-methyl-4-furazancarbonyl chloride.*—A mixture of 50 g. (0.39 mole) of 3-methyl-4-furazancarboxylic acid, 150 ml. of thionyl chloride and 1 ml. of dimethylformamide (DMF) were heated at reflux for four hours. The product distilled at 70° C./0.25 mm. Hg to give 57 g. (100%) of 3-methyl-4-furazancarbonyl chloride.

(III) *3-methyl-4-furazanacetic acid.*—To a stirred and cooled solution of approximately 0.25–0.3 mole of diazomethane in 500 ml. of ether was added, dropwise 14.65 g. (0.1 mole) of 3-methyl-4-furazancarbonyl chloride in 100 ml. of dry ether over a ten minute period. The ice bath was then removed and stirring continued for one hour. The ether was then removed in vacuo to leave an oil which was not purified further.

The oil was then heated to 182° C. in 70 ml. of benzyl alcohol and 70 ml. N,N-dimethylaniline for one hour at which time nitrogen evolution ceased. The mixture was then cooled to 20° C. and diluted with 500 ml. of ether. Next, three 300 ml. 6 N HCl extracts were taken and discarded. After one 300 ml. water wash the ether solution was evaporated to an oil at 22° C. under reduced pressure. This oil was then heated 16 hours in 80 ml. conc. hydrochloric acid and 80 ml. of glacial acetic acid on the steam bath. The mixture was cooled and the pH adjusted to 8 with 20% NaOH (aqueous). Three 600 ml. ether extracts were taken and discarded. The aqueous phase was cooled and acidified to pH 2 with conc. HCl and then saturated with salt. Three 300 ml. ether extracts were then taken, combined and evaporated to an oil. The oil was dried by adding several portions of benzene and removing same under reduced pressure. The oil then crystallized upon cooling and was recrystallized from toluene to give 6.6 g., M.P. 83–84° C. of 3-methyl-4-furazanacetic acid.

*Analysis.*—Calc'd for $C_5H_6N_2O_3$: C, 42.25; H, 4.23; N, 19.98. Found: C, 42.81; H, 4.38; N, 19.79.

(IV) *Potassium 6-(3-methyl-4-furazanacetamido)-penicillanate.*—To 0.590 g. (0.00415 mole) of 3-methyl-4-furazanacetic acid was added 3 ml. of thionyl chloride and the mixture heated on the steam bath for twenty minutes. The excess $SOCl_2$ was then removed under reduced pressure and the crude acid chloride was dissolved in 5 ml. of acetone and added dropwise to a previously prepared, vigorously stirred, solution of 1.08 g. (0.005 mole) of 6-aminopenicillanic acid, 1.68 g. (0.020 mole) of sodium bicarbonate in 10 ml. of water and 5 ml. of acetone at −5° C. The mixture was stirred for one hour with the ice-salt bath removed and then diluted with 10 ml. of water and the acetone removed under reduced pressure at 22° C. The resulting aqueous solution was extracted with one 30 ml. portion of ether and then layered with 20 ml. of ether and cooled and acidified to pH 2 with 40% $H_3PO_4$. The ether extract was then washed with three 20 ml. portions of water and dried 10 minutes over magnesium sulfate. The ether solution was then filtered and the $MgSO_4$ washed with three 5 ml. portions of ether. The combined washes and filtrate were treated with 2.5 ml. of 50% KEH (potassium 2-ethylhexanoate in n-butanol) and scratched. There was obtained 500 mg. of acetone washed and vacuum dried potassium 6-(3-methyl-4-furazanacetamido)-penicillanate decomposing at 202–203° C. IR and NMR analysis were consistent with the desired structure.

*Analysis.*—Calc'd for $C_{13}H_{15}N_4O_5S \cdot K$: C, 41.27; H, 4.00; N, 14.81. Found: [1] C, 41.27; N, 14.54; H, 3.91.

This compound exhibited M.I.C.'s versus *S. typhosa* and *Kl. pneumoniae* of about 3.1 mcg./ml. and versus *S. enteritidis* of about 0.8 mcg./ml.

*Example 2.—Sodium 7-(3-methyl-4-furazanacetamido)-cephalosporanate*

To 2.84 g. (0.020 mole) of 3-methyl-4-furazanacetic acid was added 10 ml. of thionyl chloride and the mixture heated 30 minutes on the steam bath. The excess $SOCl_2$ was then removed under reduced pressure at 22° C. and the residual oil dissolved in 20 ml. of methylene chloride and added dropwise to a previously prepared solution of 5.44 g. (0.020 mole) of 7-aminocephalosporanic acid, 5.6 ml. (0.040 mole) of triethylamine and 60 ml. of $CH_2Cl_2$ at 0° C., with stirring over a 15 minute period. The cooling bath was then removed and stirring continued for one hour. The resulting solution was concentrated to an oil under reduced pressure at 22° C. and then 75 ml. of 2% $NaHCO_3$ solution (aqueous) and 100 ml. of ether were added. After shaking, the aqueous phase was separated and layered with 75 ml. of ethyl acetate. With cooling and stirring, 40% $H_3PO_4$ was added until pH 2 was obtained. The ethyl acetate extract was then separated and washed three times with 50 ml. portions of water and twice with 50 ml. portions of saturated salt solution. The ethyl acetate solution was then dried 10 minutes over $MgSO_4$, filtered and the $MgSO_4$ washed with three 20 ml. portions of ethyl acetate and combined with the filtrate. Next, 7 ml. (0.020 mole) of sodium 2-ethylhexanoate in n-butanol was added and with scratching the product began to crystallize. After 30 minutes the product was filtered off, washed with ethyl acetate and air dried. The yield was 3.8 g. The product was found to be soluble in acetone but would crystallize to a different crystalline form when the flask was scratched. By this method the product was recrystallized to the acetone-insoluble form to yield 1.8 g. sodium 7-(3-methyl-4-furazanacetamido)-cephalosporanate decomposing at 182° C. The IR and NMR spectra were consistant with the desired structure.

*Analysis.*—Calc'd for $C_{15}H_{15}N_4O_7S \cdot Na$: C, 43.06; H, 3.62; N, 13.40. Found: [2] C, 43.77; H, 3.67; N, 13.17.

This compound exhibited M.I.C.'s of about 0.8 mcg./ml. versus the benzylpenicillin-resistant *Staph. aureux* BX-1633-2 and about 1.6 mcg./ml. versus *S. enteritidis* and of about 6.2 mcg./ml. versus *S. typhosa* and of about 6.2–12.5 mcg./ml. versus *Kl. pneumoniae* and was highly active versus *Shig. sonnei*.

---

[1] Corrected for 2.95% $H_2O$ determined by Karl Fischer method.
[2] Corrected for 3.64% water as determined by the Karl Fischer method.

Example 3

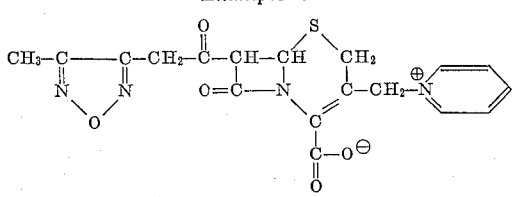

3-pyridiniummethyl-7-aminodecephalosporanic acid inner salt (1.5 g.) is shaken with methylene chloride at room temperature until the mixture becomes homogeneous and this solution is used in place of the 7-aminocephalosporanic acid solution in the procedure of Example 2 to prepare 3-pyridiniummethyl-7-[α-(3-methyl-4-furazan)acetamido]decephalosporanic acid inner salt. This product is sensitive to light so that it is advisable to protect it from light as much as practical during its manufacture and subsequent processing and packaging.

Example 4

3-methyl-4-furazan-acetic acid (0.002 mole) and 2,4-dinitrophenol (0.002 mole) are dissolved in dry dioxane (10 ml.) and the solution is cooled in an ice bath. N,N'-dicyclohexylcarbodiimide (0.002 mole) is added and the solution is shaken well and left at room temperature for 45 minutes. The precipitated urea is removed by filtration and washed with ethyl acetate (25 ml.). The filtrate and washings are combined and concentrated in vacuo at room temperature to leave as the residue the desired 2,4-dinitrophenyl 3-methyl-4-furazan-acetate.

3-pyridiniummethyl-7-aminodecephalosporanic acid inner salt (0.002 mole) is shaken with methylene chloride at room temperature until the mixture is homogeneous. The mixture is cooled in an ice bath and 2,4-dinitrophenyl 3-methyl-4-furazan-acetate (0.002 mole) is added with shaking and the resulting solution left at room temperature until completion of the reaction. The reaction is followed by measuring the intensity of the amide absorption band at 1675 cm.$^{-1}$ in the infrared spectrum. The mixture is filtered and addition of ether precipitates the product, 3 - pyridiniummethyl-7-[α-(3-methyl-4-furazan) acetamido]decephalosporanic acid inner salt. The product is dissolved in methylene chloride, reprecipitated with ether, collected, dried and found to contain the β-lactam structure as shown by infrared analysis, to inhibit *Staph. aureus* at low concentrations and to be highly soluble in water.

Example 5

Pyridine (10 ml.) is added with stirring to a mixture of water (50 ml.) and 7-[α-(3-methyl-4-furazan)acetamido]cephalosporanic acid (5 g.) to form a solution which is left under nitrogen at about 45° C. for twelve hours and then extracted four times with 20 ml. methylene chloride. The aqueous phase is concentrated in vacuo at about 30° C. and then passed through a column containing a strongly basic, anion exchange resin of the quaternary ammonium type (e.g. "Dowex 1") in the acetate cycle. The eluates containing the desired pyridine derivative as judged polarimetrically are combined, lyophilized and triturated in methanol to give solid 3-pyridiniummethyl-7 - [α-(3-methyl-4-furazan)acetamido]decephalosporanic acid inner salt. By concentrating the methanol triturate at 30° C. in vacuo and then pouring the concentrate so obtained into a large volume of acetone there is precipitated an additional amount of this product.

Example 6

Substitution of an equal volume of α-picoline, γ-picoline and 2,4-lutidine, respectively, for pyridine in the procedure of Example 5 produces 3-α-picoliniummethyl-7-[α-(3-methyl-4-furazan) acetamido]decephalosporanic acid inner salt, 3-γ-picoliniummethyl-7-[α-(3-methyl-4-furazan)acetamido]decephalosporanic acid inner salt, and 3-2',4'-lutidiniummethyl-7-[α-(3-methyl-4-furazan)acetamido]decephalosporanic acid inner salt, respectively.

Example 7

Substitution of an equimolar amount of 3-γ-picoliniummethyl-7-aminodecephalosporanic acid inner salt for the 3-pyridinium-7-aminodecephalosporanic acid inner salt in the procedure of Example 4 produces 3-γ-picoliniummethyl - 7 - [α - (3 - methyl - 4 - furazan)acetamido]decephalosporanic acid inner salt.

Example 8

The product of Example 2 is dissolved in water and treated with acetylesterase obtained from orange peels according to the procedure of Jansen et al., Arch. Biochem. 15, 415 (1947) at pH 6 for 15 hours. The resulting solution is passed through a column containing a weak, anionic ion exchange resin (e.g. "Amberlite IR 4B") in the acetate form and the column is then eluted with aqueous acetic acid which has been adjusted to pH 5.5 with pyridine. The eluate is adjusted to pH 8 by the addition of sodium hydroxide and is then evaporated in vacuo to give 3-hydroxymethyl-7-[α-(3-methyl - 4 - furazan)acetamido]decephalosporanic acid in the form of its sodium salt.

Example 9

When in Example 2 the 7-aminocephalosporanic acid is replaced by an equimolar amount of 3-methyl-7-aminodecephalosporanic acid there is obatined the sodium salt of 3-methyl-7-[α-(3 - methyl - 4 - furazan)acetamido]decephalosporanic acid.

Example 10

3-hydroxymethyl - 7 - aminodecephalosporanic acid lactone (0.002 mole) is shaken with methylene chloride at room temperature until the mixture is homogeneous. The mixture is cooled in an ice bath and 2,4-dinitrophenyl-3-methyl-4-furazan-acetate (0.002 mole) is added with shaking and the resulting solution is held at room temperature until completion of the reaction is followed by measurement of the intensity of the amide absorption band at 1675 cm.$^{-1}$ in the infrared spectrum. After filtration, the addition of ether to the filtrate precipitates 3-hydroxy-methyl-7-[α-(3-methyl - 4 - furazan)acetamido]decephalosporanic acid lactone. The product is dissolved in methylene chloride, reprecipitated by adding ether, collected by filtration and dried.

Example 11

7-aminocephalosporanic acid (0.001 mole) and triethylamine (0.004 mole) are shaken in methylene chloride (2 ml.) until the mixture is homogeneous. This mixture is cooled in an ice bath and 2,4-dinitrophenyl-3-methyl-4-furazan-acetate (0.001 mole) dissolved in 3 ml. methylene chloride is added with shaking; the resulting solution is allowed to stand at room temperature for two hours to complete the reaction. The progress of the reaction is followed by measuring the intensity of the amide absorption band at 1675 cm.$^{-1}$ in the infrared spectrum. The addition of dry ether precipitates the triethylamine salt of 7-[α-(3-methyl-4-furazan)-acetamido]cephalosporanic acid.

Example 12

7-aminocephalosporanic acid (10 g., finely divided) is suspended in boiling ethyl acetate (400 ml.) and 3-methyl-4-furazan-acetyl chloride (10 g.) in ethyl acetate (40 ml.) is added. The mixture is boiled under reflux for one hour, cooled and filtered. Aniline (10 ml.) is added and after one hour the mixture is extracted four times with 200 ml. portions of 3% aqueous NaHCO$_3$ and the combined alkaline, aqueous extracts are extracted three times with ethyl acetate (200 ml. portions), discarding the ethyl acetate extract. The aqueous solution is acidified to pH 1.2 and the product, 7-[α-(3-methyl-4-furazan)acetamido]cephalosporanic acid, is twice extracted into ethyl acetate (300 ml.) portions. The combined ethyl acetate extracts are washed with water (4 x 100 ml.), dried over anhydrous MgSO₄, filtered to remove the drying agent and concentrated in vacuo at room temperature to precipitate the product, which is recrystallized, if desired, from aqueous acetone or ethanol.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

I claim:
1. The acid of the formula

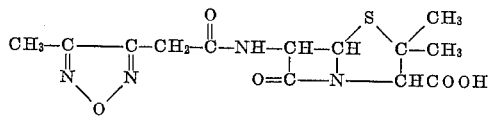

and nontoxic, pharmaceutically acceptable salts thereof.
2. A compound of the formula

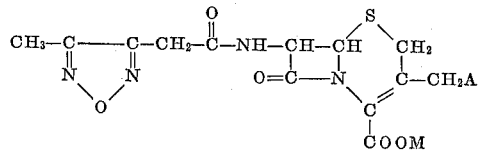

wherein A is hydrogen, hydroxyl, (lower)alkanoyloxy, benzoyloxy, a quaternary ammonium radical of the formula

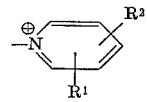

wherein each of $R^1$ and $R^2$ is hydrogen or methyl or, when taken together with M, a monovalent carbon-oxygen bond; and M is hydrogen, a pharmaceutically acceptable nontoxic cation, an anionic charge when A is a quaternary ammonium radical or, when taken together with A, a monovalent carbon-oxygen bond.

3. A compound of claim 2 having the formula

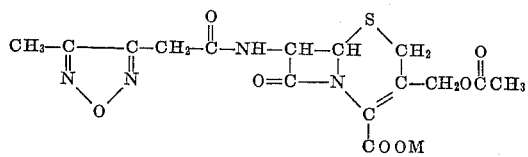

wherein M is a nontoxic, pharmaceutically acceptable cation.

4. A compound of claim 2 having the formula

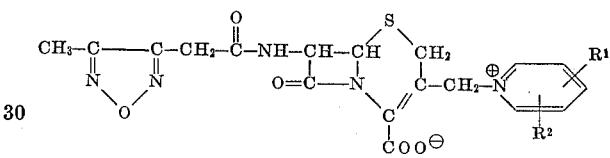

wherein $R^1$ and $R^2$ are each hydrogen or methyl.

5. The compound of claim 4 wherein $R^1$ and $R^2$ are each hydrogen.

No references cited.

NICHOLAS S. RIZZO, *Primary Examiner.*

UNITED STATES PATENT OFFICE
CERTIFICATE OF CORRECTION

Patent No. 3,322,751                                May 30, 1967

Leonard Bruce Crast, Jr.

It is hereby certified that error appears in the above numbered patent requiring correction and that the said Letters Patent should read as corrected below.

Column 1, lines 50 to 56, formula I should appear as shown below instead of as in the patent:

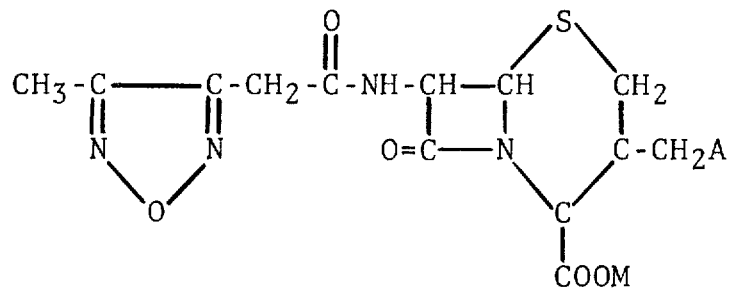

column 3, line 15, for "N,N′-carbonyditriazole" read -- N,N′-carbonylditriazole --; column 5, lines 16 to 19, the formula should appear as shown below instead of as in the patent:

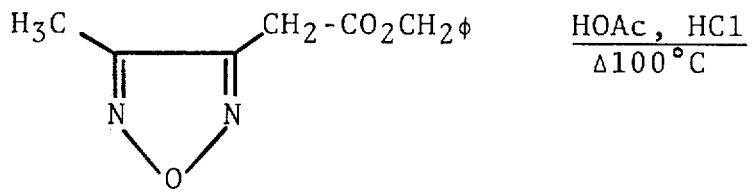

column 8, line 31, for "obatined" read -- obtained --; column 10, line 35, strike out "No references cited." and insert the following:

3,322,751

References Cited by the Applicant

UNITED STATES PATENTS

| | | |
|---|---|---|
| 2,941,995 | 6/1960 | Doyle et al. |
| 2,951,839 | 9/1960 | Doyle et al. |
| 2,985,648 | 5/1961 | Doyle et al. |
| 2,996,501 | 8/1961 | Doyle et al. |
| 3,174,964 | 3/1965 | Hobbs et al. |

FOREIGN PATENTS

| | | |
|---|---|---|
| 889,066 | 2/1962 | Great Britain |
| 905,778 | 9/1962 | Great Britain |
| 948,076 | 1/1964 | Great Britain |
| 957,570 | 5/1964 | Great Britain |
| 982,252 | 2/1965 | Great Britain |

Signed and sealed this 30th day of July 1968.

(SEAL)
Attest:

EDWARD M. FLETCHER, JR.
Attesting Officer

EDWARD J. BRENNER
Commissioner of Patents